Feb. 21, 1956  H. T. LANGE  2,735,272
LIQUID-LEVEL CONTROL DEVICES
Filed Aug. 13, 1951  2 Sheets-Sheet 1
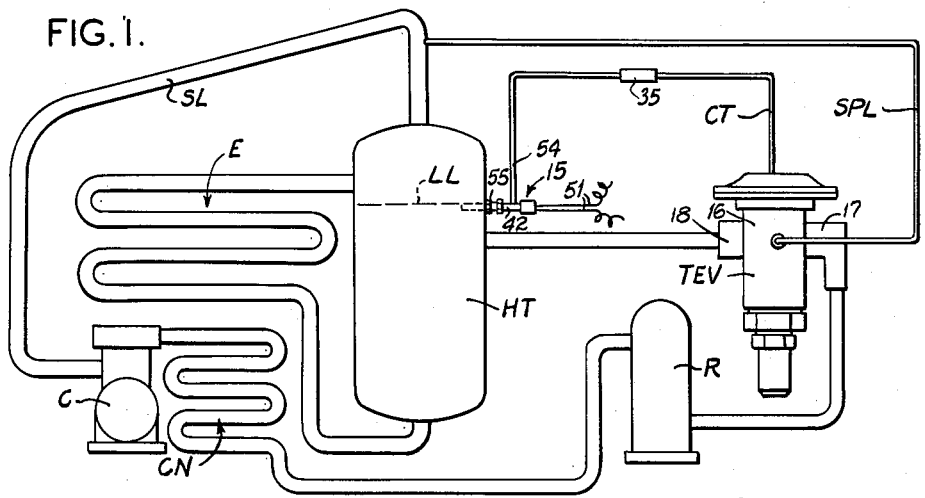
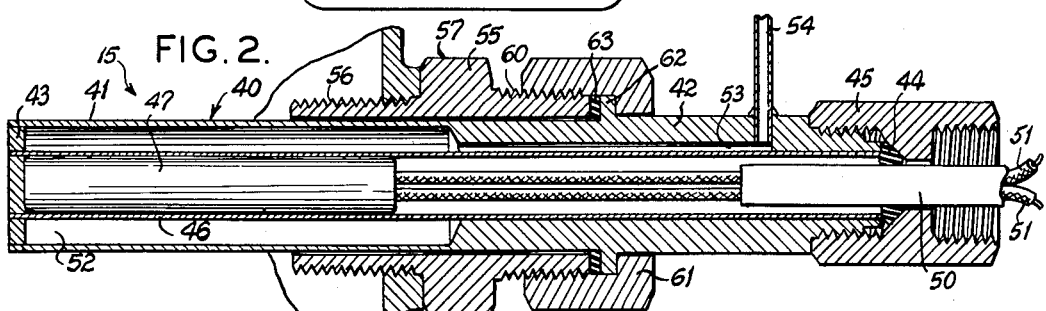
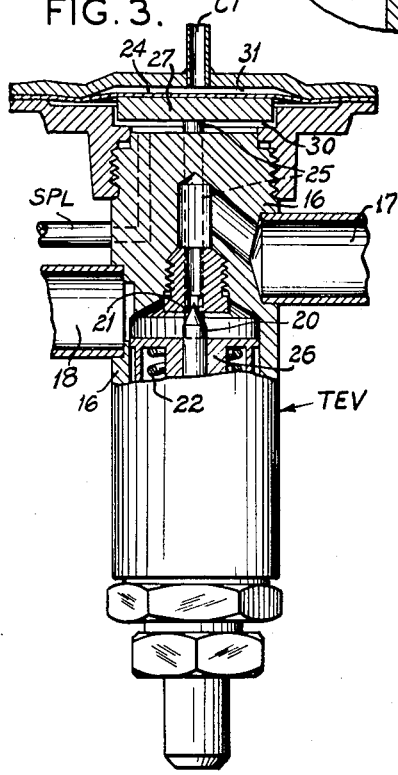
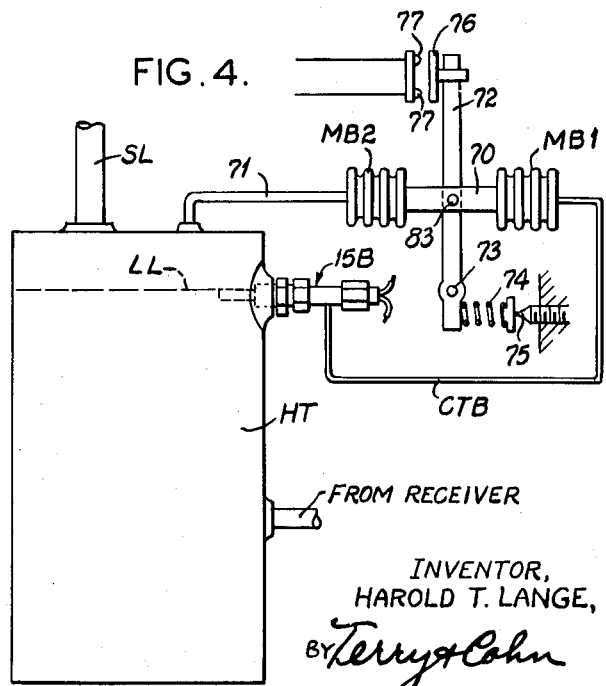
INVENTOR,
HAROLD T. LANGE,
BY Terry & Cohn
ATTORNEYS.

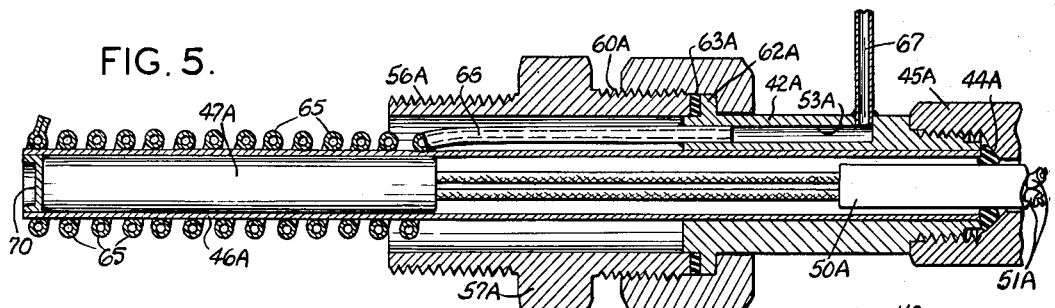
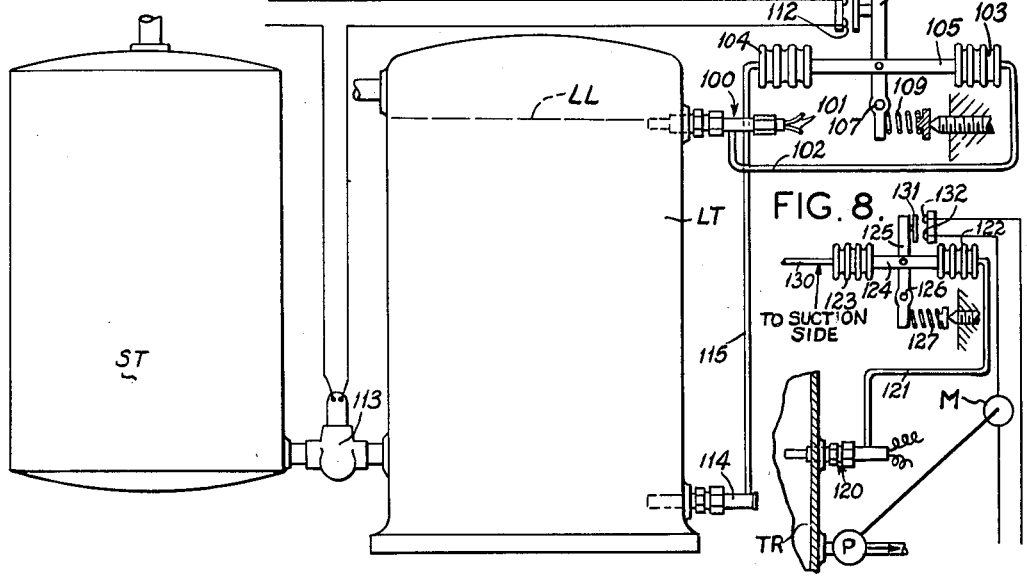
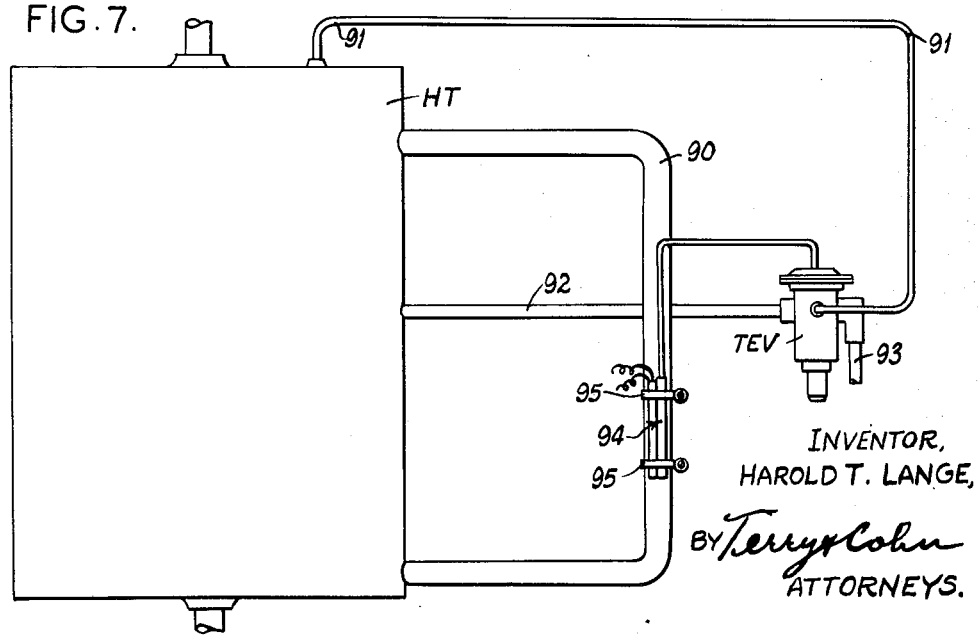

United States Patent Office 2,735,272
Patented Feb. 21, 1956

2,735,272

LIQUID-LEVEL CONTROL DEVICES

Harold T. Lange, Webster Groves, Mo., assignor to Sporlan Valve Co. Inc., St. Louis, Mo., a corporation of Missouri Application August 13, 1951, Serial No. 241,641

7 Claims. (Cl. 62—8)

This invention relates to improvements in liquid-level control devices, and more particularly to thermostatic means for establishing a desired maximum level of liquid in a container therefor, the present improvements being particularly, but by no means exclusively, adapted for use in and with refrigeration systems, as for establishing a predetermined level of liquid refrigerant in a tank supplying the evaporator unit.

Numerous arrangements have heretofore been devised, and some thereof used with indifferent success, for the purpose of establishing or controlling liquid volume in a container. Many such devices include the old and well known float and valve assembly, and more recently, certain rather complicated and expensive electronic control units for such purpose. Level control units of other types have failed of general adoption and usage, largely because of cost factors and prohibitive service requirements.

A control system for the purpose noted which involves the use of moving parts internally of a closed container, such as a float valve for example, involves frequent service attention, and is of questionable functional dependability. High first cost and the requirement of frequent and skilled service attention have precluded the general adoption of electronic equipment for this purpose. It is accordingly a major and principal objective of the present improvements to obviate the recognized inadequacies of present equipment of the types noted, and to realize a positively operating, trouble-free and inexpensive device for liquid flow control which requires no moving parts in the region of the body of liquid.

A further and important object of the present improvements is realized in a liquid level control system which takes advantage of the reliable and dependable function of a thermostatic expansion valve, or equivalent separate elements thereof, and which acts in response to temperature differentials in a localized region at the top liquid level for purposes of valve opening and closing control, hence of maintenance of liquid level as in a refrigerant liquid accumulator, water tank or other liquid container.

Yet another object of the invention is realized in certain improved combinations of thermal responsive units with liquid tanks and control valves in combination therewith, and which utilize for purpose of liquid level control, the heat absorbing function of the liquid to be controlled when same attains a desired level in a tank or the like, to effect regulation of a thermally responsive valve.

A still further and valuable object of the present improvements is realized in a control system in which a thermally controlled valve is caused to function by differential pressures proportioned respectively to thermal conditions at the desired level of liquid, and to a vapor pressure or other condition in the system including the liquid tank.

An additional important objective is realized in the provision of an improved insert element to be disposed within the tank or chamber communicating therewith, at the desired level of liquid to be maintained, and which embodies, in a substantially enclosed static unit, a thermal sensing element and a thermal source which, together with the liquid, influences the response of such element.

Still another object, particularly of advantage in certain fields of usage, is realized in a package unit in the nature of a sensing bulb and a heating element immediately juxtaposed in heat exchange relation, such unit including fluid sealing means and assembly provisions constituting a useful article of manufacture for the general field of liquid level control.

The foregoing and numerous other objects will more clearly appear from the following detailed description of certain present embodiments of the improvements, particularly when considered in connection with the accompanying drawing, in which:

Fig. 1 is a diagram of a refrigeration system embodying present improvements;

Fig. 2 is a longitudinal sectional view of a preferred form of heated sensing unit of insert type, such as adapted for use in a system exemplified by Fig. 1 and other systems shown;

Fig. 3 is a longitudinal sectional view, partly in elevation, of a typical thermostatic expansion valve utilized in certain of the control systems presently disclosed;

Fig. 4 is a diagrammatic view of a modified system and control arrangement utilizing present improvements;

Fig. 5 is a view similar to Fig. 2, showing a modified structure of heated sensing unit;

Fig. 6 is a diagram of a liquid system with a further modified arrangement and combination of thermal sensing units;

Fig. 7 is a diagram of a refrigeration system generally similar to that of Fig. 1, but utilizing a heated sensing unit of external type, adjustable in position to enable variation of tank liquid level; and Fig. 8 is a diagram of a system in which a liquid-level responsive unit is utilized to control emptying of a tank.

Referring now by characters of reference to the drawing, and first describing the liquid level control provisions as same are typically applied in a refrigeration system, reference is first made to Fig. 1, in which there is noted for completeness a compressor C, suitably power driven, a condenser CN, from which liquid refrigerant is supplied to a receiver R, whence the liquid is directed through a thermostatic expansion valve TEV to a header tank HT. Connected to tank HT is evaporator E, one end of which is connected to a lower portion of the tank HT and the opposite end to a vapor space above the predetermined liquid level indicated by the dotted line LL, as will later appear. Thus the upper portion of the tank HT will receive refrigerant vapor emanating from the evaporator E, an upper portion of the tank being connected through suction line SL thus to close the refrigeration circuit to and through the compressor C.

A line of tubing SPL serves to supply to the thermostatic expansion valve, fluid under suction pressure, this suction pressure line in the present arrangement connecting the space just below the diaphragm of the thermostatic expansion valve assembly, with the suction line SL. This is, per se, now well known in the art. In most installations the line SPL is optional, since, assuming a large diameter, short run line between the valve assembly TEV and tank HT, the chamber 30 (Fig. 3) is normally kept at about suction pressure. The chamber above the diaphragm and hence when under pressure urging same in opposition to the suction pressure therebelow, is connected through a line of control tubing CT, to a thermal sensing unit generally indicated at 15 as shown by Fig. 2, and hereinafter described in structural and functional detail.

Although any of a wide variety of types of thermostatic expansion valve may be employed in the arrangement of Fig. 1, merely for completeness of structure and understanding of the relation of such valve to the present system, it will appear from Fig. 3 that the unit TEV consists of a valve body 16, an inlet fitting 17, an outlet fitting 18, and a valve member 20. In this case the valve member opens downwardly as illustrated, so as, according to thermostatic influence on the valve, to open and close the valve seat 21; the valve being closed by a valve spring 22, usually adjustable in loading. Actuation of the valve occurs through the action of a diaphragm 24 connected through push rods 25 to a valve holder 26, the push rods being connected to a follower plate 27 around which is plenary clearance to enable at all times communication of the suction pressure through line SPL to the chamber 30. The diaphragm is perimetrally sealed as will be understood, and the chamber thereabove indicated at 31 is in communication with the line of control or capillary tubing CT, communicating with the sensing unit 15.

The operation of the valve assembly is or may be conventional insofar as function of its internal parts are concerned, hence will require no extended description.

It will later appear that the insert sensing unit includes a thermally responsive feeler bulb or the like, and in the system of Fig. 1, the motor unit of the system identified with the diaphragm of the valve assembly, is actuated responsively to expansion of the motor fluid occupying the system within the unit 15, the line of tubing CT and the upper diaphragm chamber 31. In the arrangement of Fig. 1, the type of charge is generally referred to as a liquid charge, utilizing sufficient control liquid to fill the chamber 31 above the diaphragm, the line of tubing CT, and part of the sensing unit such as a bulb, in the unit 15. In such an arrangement there is a possibility of rupture of the diaphragm or other expansible valve-actuating element such as a bellows, in case the temperature of the bulb rises above, for example 120 degrees F. It has been found that, with such a liquid-charged valve actuating system this hazard is somewhat accentuated by the use of a heating element adjacent the bulb, as is the case in unit 15. Such danger is however obviated by disposing in the line of capillary tubing CT and in a zone remote from the heating element, an additional capacity member which may be in the nature of an extra bulb in the line CT, and located in such line both remote from the unit 15 and from the valve assembly TEV. This additional or secondary bulb is thus not subject to any temperature as low as refrigerant temperatures. It functions as a receiver of the liquid charge in case the sensing bulb at the heating element in unit 15 were to be abnormally heated. The presence and location of such auxiliary capacity unit will prevent the pressure in the system 15–CT–TEV from rising above a value corresponding to the temperature of such auxiliary bulb, designated at 35 (Fig. 1). In normal usage, however, it is to be noted that the sensing bulb as a part of unit 15, will determine valve action, inasmuch as the temperature of the sensing bulb is lower than that of the auxiliary bulb 35. The use of a liquid charge in such a system offers the advantage over the gas-charged element, since no precautions are thus required to maintain the expansion valve element warmer than the refrigerant temperature.

It should be noted that the system of Fig. 1 is entirely practical and fully operative with all items of apparatus as shown, but utilizing a gas charge in the valve motor system 15–CT–TEV. In this case there is no need for unit 35, which will accordingly be omitted from line CT.

Referring now to a preferred form of insert unit such as shown by Fig. 2, such control unit comprises an elongate body generally designated at 40, and which as an enclosure of the sensing end of the unit, includes a thin wall tubular portion 41, extended toward the opposite end to constitute a heavy wall portion 42. The body is sealed at its inner or left hand end as shown, by an end closure cap 43, welded in place, and at its opposite or outer end as by a sealing ring 44, held in place against the end of body 42 as by a tubular nut and cap member 45 threaded to the body 42. A thin-wall inner metal tube 46 is welded to the cap 43, and at its opposite end to the adjacent portion of body member 42, the tube 46 being located coaxially with respect to the body members 41 and 42.

Within the inner tube 46 is a small cartridge-type heating element 47, the conductors supplying same extending outwardly of the unit through a flexible sealing sleeve 50 with which the ring 44 forms a fluid-tight joint, the external connections 51 being provided as energizing leads to a suitable source of electric energy (not shown).

The space of annual section between the tubes 41 and 46 serving as a sensing bulb, contains a motor fluid, the quantity of which will depend upon the nature of the charge of the valve actuating system, whether gas-charged or liquid-charged, as above described. There is provided in connection with this annular chamber indicated at 52, a small outlet passage 53 directed to an external capillary connection 54 which is or may be identical with the line CT.

As a convenient means for mounting and sealing off the insert unit in case same is to be mounted partly in a tank or liquid receiver of any type, there is conveniently provided a threaded mounting fitting 55 provided with a male thread 56 which may be threaded directly into a tank wall fitting, 56 preferably consisting of a standard pipe thread. A hex head 57 facilitates actuation of the fitting 55, and a threaded portion 60 on the outside of the fitting 55 receives a nut 61, the body portion 42 being externally shouldered as at 62 so as to receive a ring gasket 63 between the shoulder and the end wall of the fitting 55. Thus when the elements 61 and 55 are threaded up, the insert is fully externally sealed off, and is rigidly supported by screw thread mounting means. It is noted that, with the arrangement just described, it is a preference, although not strictly necessary in many cases, that the insert unit be mounted horizontally with its axis approximating the plane of maximum desired liquid level in the receiver or tank. It may be noted that the charged chamber 52 fulfills in every way the usual function of a sensing bulb such as commonly used of itself, in combination with a thermostatic expansion valve. It should further be noted as a preference that the heating element 47 be of a low output rating, since usually continuously energized, although deenergized when the system is not operating, and further since an element of only a low wattage and heat output is functionally sufficient.

In Fig. 5 there is illustrated a minor modification of the insert unit shown by Fig. 2, it being sufficient merely to note the differences therebetween. In the modified form shown by Fig. 5, the bulb consists of a series of spirally wrapped turns of capillary tubing 65, the innermost end (to the left Fig. 5) of which will be sealed off, and the opposite end of which is carried outwardly through a straight length of capillary tubing 66 to a connection 67 leading into or identical with the line of tubing CT. The inner end closure cap 70 is in this case of smaller diameter than the cap 43. It will be noted that the wrapped turns of capillary tubing 65 constitute a bulb and the space therein a bulb chamber formed about an axis which is the same as that of the inner tube. It will be noted that the turns of tubing 65 are in intimate heat exchange relation to the ambient liquid when same closely approaches and attains the level at which the insert unit is mounted, and further, as in the case of the coaxial inner and outer chambers of the structure of Fig. 2, the bulb formed of the capillary tubing in Fig. 5 is likewise in thermal exchange relation to the cartridge type heater element. Other parts of the modified form of Fig. 5 are designated by the same reference characters utilized in Fig. 2, but with addition of the suffix letter A to distinguish thereover. In the preceding and following description it will be understood that either of the forms of insert unit thus far described, may be utilized in any of the systems herein disclosed, with equal result.

A somewhat modified arrangement of system is shown by Fig. 4, wherein a tank HT is liquid-supplied from the receiver, and has its vapor space in communication with the suction line SL. In this system an insert control unit is generally indicated at 15B, and has its sensing bulb connection completed through a line of capillary tubing CTB as to a metal bellows MB1 which may be directly coupled through a link 70 to an opposing similar bellows MB2, the latter being pressure-supplied through a line 71 to the vapor space of the tank HT or optionally to the suction line SL. A control bar or lever 72 is supported by a fixed pivot 73, this lever 72 being spring-urged through its end opposite pivot 73, by a compression spring 74 provided with an adjusting block 75 for variation of spring loading against the lever 72. The opposite, shown as the upper end of the member 72, carries a contact plate 76 serving at times to bridge a pair of mutually insulated fixed contacts 77 in one side of an electrical circuit directed to a magnet valve disposed in the line which supplies the tank HT. These latter elements may be identical with those shown by Fig. 6. Thus it will appear that as lever 72 has its upper portion (Fig. 4) displaced sufficiently (to the left in this figure), the circuit will be closed through contacts 77 with energization of the solenoid in the magnet valve, opening the valve in the line supplying liquid to the tank HT. It may be noted that the bar 70 operatively interconnecting the bellows MB1 and MB2, is pivotally attached as at 83 to the contact-closing lever 72. It may be noted that besides or in lieu of controlling liquid flow, the circuit including contact members 76—77 may energize visual or audible signal devices (not shown) such as a light or bell to advise the operator of the current functional situation obtaining in the system. Alternately or additionally, the relation of the contacts may be reversed on the switch lever, so as to utilize the same control in a reverse relation, for example as suggested by Fig. 8, later described, to energize a pump motor for evacuating a trap or other tank responsively to a given level therein.

A further, somewhat modified arrangement particularly as to the manner of mounting the control unit, is shown by Fig. 7. In this arrangement the control unit comprising the cartridge heater and the sensing bulb, is located externally and adjustably with respect to the tank HT. In this case a liquid leg 90 has its lower end connected into a normally liquid-containing or lower portion of the tank HT, and its upper end connected into the vapor space or upper portion of this receiver. As in earlier-described arrangements, the thermostatic expansion valve TEV is similarly connected to the upper portion of the tank, as through a line of tubing 91, for communication of suction pressure. The valve discharging into tank HT through line 92 is supplied from the receiver through connection 93. If desired, the liquid leg 90 may be formed of a thin-wall, highly conductive metal tubing, and strapped or clamped to the riser portion of the liquid leg is the control unit generally indicated at 94 and which may correspond in all essentials to either of the units shown by Fig. 2 and Fig. 5. The unit 94 is adjustably secured in thermal exchange relation to the liquid leg 90 as by a pair or more of screw clamps indicated at 95. Now obviously, upon loosening the screw clamps, the unit 94 may be disposed at any desired adjusted height along the leg 90, the clamps being set to hold the heater-sensing unit in desired position. It will be understood, of course, that in this modification, clamps 95 will take the place of the fitting 55 or 55A of the internal types of sensing units.

With reference now to Fig. 6, the arrangement therein shown includes a liquid tank LT, the content of which is to be maintained approximately at the level indicated by dotted line LL. Located substantially in the same plane, and shown as an insert unit, is the assembly generally indicated at 100, and which may be taken as identical, for example, with the unit shown by Fig. 2 or that of Fig. 5, and including both a low-output electric resistance unit, supplied by leads 101, and containing a bulb charged with a thermal sensing fluid, as described in connection with Fig. 2, for example. A control line of capillary tubing indicated at 102 is directed in this case to a bellows 103, arranged in opposing relation to a similar bellows 104, these units being connected through a bar 105 pivoted to lever 106 operating about a fixed pivot 107, and spring loaded by an adjustable coil spring 109. A conductive plate 110 is carried by the outer end of lever 106, and when the latter is moved to the left (Fig. 6) closes the circuit through contacts 111—112. This circuit when completed, will energize the magnet valve 113 which, when thus energized, is open to admit a flow of liquid from a supply source ST to the tank LT. This arrangement, but for a different location and purpose of the two sensing units, is or may be the same as illustrated by Fig. 4, and described in reference to that figure of drawing. Fig. 6, however, differs from Fig. 4 in the use of a second sensing unit generally indicated at 114, and which may consist either of a simple form of sensing bulb (not shown), or if desired, may be identical with the arrangement of Fig. 2, but omitting the heater unit. In this modification the unit 114 has its fluid system connected for control purposes through a capillary line 115 to the bellows 104, from which it will now have appeared that the pressures derived from the fluid systems of the insert units 100 and 114, both usually containing the same fluid charge, will act in opposition to each other through the bellows 103—104. In the arrangement of Fig. 6, the unit 114 will be located below the usual liquid level normally desired in the tank LT. This arrangement may be used for refrigerants, and as well for liquids other than refrigerants, for example, water, oil, and many others.

The arrangement shown by the diagram of Fig. 8 represents a minor variant of apparatus earlier described, for the purpose of drainage or evacuation of a container such as a tank, one example of such application being for trap drainage in a refrigeration system. In the arrangement of Fig. 8, a heated thermal sensing unit 120 is utilized, which unit may be identical with either of those of Figs. 2 and 5, as a source of fluid pressure for control purposes to influence a fluid motor. The unit 120 is mounted at the desired height or liquid level, projecting through a wall of the trap TR, only a portion of which is shown. A capillary pressure line 121 connects the unit 120 to bellows 122 connected in opposing relation to a companion such unit 123, the two bellows being connected by a bar 124 pivoted to a control lever or actuating arm 125. The arm 125 is pivoted at 126, and operates in one direction in opposition to an adjustable spring 127, the bellows 123 being connected through a line 130 to a space in the trap above liquid levels therein, or otherwise to the suction side of the refrigeration system. In this arrangement, the contact plate 131 serves at times to bridge spaced paired contacts 132, whereupon will be closed the line directed to the motor M. In this example, M identifies a pump motor connected to pump P employed for evacuation of the trap and return of the liquid therein to the high pressure side of the system, as will be well understood. In certain other fields of usage, the pump motor M may, now obviously, be replaced by a magnetic drain valve or other form of drainage control.

The structural features and the operation of the systems and units of apparatus thus far described, are thought to have become evident from the preceding detail of disclosure, but it may be noted for completeness that in the arrangement of Fig. 1 the diaphragm (Fig. 3)

will be subject to two opposing pressures, viz., that imparted below the diaphragm through the suction pressure line SPL or the discharge line from unit TEV on the one hand, and that oppositely imparted to the diaphragm through the unit 15 and line CT leading into the chamber 31 above the diaphragm, in the thermostatic valve assembly. Assuming the tank HT to have been depleted or even emptied, the effect of the heater element in unit 15 will, now obviously, serve rapidly to heat the charge in the fluid chamber of the unit for example, such as shown by Fig. 2. This pressure, acting downwardly against the diaphragm, in the assembly shown by Fig. 3, will open the expansion valve, admitting liquid through the line directed therefrom to the tank HT. When the liquid level in the tank attains that identified with the line LL, the heat absorbing effect of the adjacent liquid, which is in intimate heat exchange relation both to the sensing bulb and the heating element 47, will cool the fluid motor charge in the bulb portion of the unit, thus quickly reducing pressure in the line CT and in chamber 31 above the diaphragm, permitting the latter to close under influence of the suction pressure and the valve spring.

In the case of a liquid control charge, the action has heretofore been described, particularly in reference to the desirable emergency function of the added capacity element 35. In the case of a gas charge, with liquid at top level, pressures in the diaphragm chamber will rapidly diminish, causing closing of the expansion valve and fixing the liquid level at or close to the line LL so as to assure a vapor space in the tank above the height of line LL, hence also above the unit 15.

In respect to Fig. 4, it will now have become obvious that the opposing pressures to which the bellows MB1 and MB2 are respectively subject, consist as to the first of these, of the bulb pressure derived from unit 15B, and that the second consists of suction pressure derived through line 71 either from the upper portion of tank HT or from the suction line. It will now have become apparent that with a low liquid level, the unit 15B is relatively warm, hence pressure of a higher order will exist in the bellows MB1, causing closing of the contacts by member 76 bridging the terminals 77 and closing the circuit as to a magnet valve controlling flow to the tank HT (see Fig. 6). When, however, the level of the liquid reaches the plane of the sensing unit 15B, the liquid will readily absorb the thermal output of the bulb portion of the unit, and will chill the fluid content of same resulting in a rapid diminution of pressure in bellows MB1. The spring 74 and the suction pressure acting through bellows MB2, will quickly open the magnet valve circuit, causing same to close with cessation of flow to the tank HT, thus establishing level LL.

Operatively the arrangement shown by Fig. 6 departs somewhat from those just described, in that the normally submerged unit 114 will vary in its pressure response in accordance with varying temperatures of the liquid in tank LT. This variation will influence the opening and closing of the magnet valve supplying tank LT, as through the line 115 and bellows 104, the expansive movement of the latter being opposed by bellows 103. The latter is under pressures of a higher order when the liquid level falls, due to the heating effect of the resistance element in unit 100, but when the latter and the sensing bulb of this unit are reached by the rising liquid level in the tank, the increased absorption of the thermal output of the heater in unit 100, rapidly diminishes the pressure in bellows 103. Then bellows 104 and spring 109 will again open the circuit to the supply-controlling magnet valve 113.

The operation of the arrangement shown by Fig. 7 is essentially the same as that described in reference to Fig. 1, since each of these systems utilizes a thermostatic expansion valve. It is sufficient to note that in Fig. 7, although the liquid does not directly contact either the bulb portion or the heater element envelope of the unit 94, the effect is nevertheless much the same since both such units are directly influenced by the liquid in the leg 90 when the liquid reaches the height of the control unit.

The mode of operation of the system diagrammatically shown by Fig. 8 may be considered identical to the similar fluid motor arrangements and fluid pressure sources in connection therewith, with the exception of reversal of the contacts 131—132 in the system of Fig. 8. The reversal of direction of liquid flow with respect to the tank, as necessary for drainage purposes, results in energization of the pump motor M, with operation of pump P, responsive to liquid in the trap reaching the level of the unit 120. It will now be obvious that upon attainment of such level in the trap, the cooling effect of the liquid on the unit 120 results in a reduction of pressure in bellows 122, with the result that spring 127 and the pressure in bellows 123 will cause movement of the control arm or lever 125 to the right (Fig. 8) thus energizing the pump motor M, with withdrawal of the liquid content.

It will be understood that the various individual features shown in the several and systems disclosed, are in most cases interchangeable in such systems, for example, in many cases the multiple bellows arrangement magnet valve may be substituted for the thermostatic expansion valve, and vice versa.

Although the invention has been described by making detailed reference to but a few of the numerous possible embodiments and fields of usage, the detail of description should be understood as instructive, rather than limiting in nature, numerous variants being possible within the scope of the claims hereunto appended.

I claim as my invention:

1. In a liquid level control assembly, a closed liquid receiver, the liquid level within which is to be controlled in correlation with a pressure condition, a source of liquid supply to the receiver, a suction line adapted to exhaust gas from said receiver, a valve located to control flow between said source and the receiver, a valve motor, valve motor actuating devices including a first device responsive to temperature in the region of desired maximum liquid level in the receiver, heating means in such liquid level region, said heating means being in thermal exchange relation to said first device and to the liquid in said receiver, and being of a low heat output such that adjacence of the liquid thereto will substantially absorb and nullify the heating effect of such heating means, and a second motor actuating device responsive to pressure in said suction line, the valve, valve motor and actuating devices being freely operable at all times in response to differentials in pressures influencing said devices.

2. In a controlled liquid supply system, a receiver for the liquid, a source of liquid supply connected to the receiver, a valve controlling the flow from said source to the receiver, two fluid motors operatively connected to the valve in mutually opposing relation, for valve operation, separate fluid-pressure actuating sources respectively connected to the fluid motors, one such source being located at a height along the receiver corresponding substantially to a level of liquid to be maintained therein, another such source being located at a height substantially vertically remote from the first said source, and a heating element in thermal exchange relation to said first source and in heat exchange relation with the liquid near the level of said first source, the heating element being characterized by a thermal output of an order substantially absorbable by the liquid adjacent thereto.

3. In a refrigeration system, an evaporator supply tank normally adapted to contain a liquid, an evaporator coil having its inlet and outlet communicating with said tank, a suction line in communication with the outlet of said evaporator coil, a valve including a valve-operating element controlling the flow of liquid to said tank, a supply conduit between said valve and said tank, a feeler bulb provided with a fluid charge in controlling relation to the valve, tubing connecting said bulb to said valve-operating element, the feeler bulb being disposed adjacent to and in heat exchange relation with liquid in the tank at the desired maximum liquid level therein, a heating element in close heat exchange relation to the feeler bulb and to the liquid in the region of said tank level, the heating element being characterized by a thermal output that is substantially absorbed and nullified by the adjacent liquid at the tank level, and a fluid pressure device responsive to a pressure condition in said suction line and operatively influencing said valve-operating element, and hence said valve in opposition to pressure conditions in the feeler bulb.

4. In a refrigeration system, an evaporator supply tank adapted to contain a liquid, a thermally operated valve for controlling the flow of liquid to said tank, a sensing unit disposed in heat exchange relation with the liquid in the tank at the desired liquid level, a valve-motor unit, a length of small-diameter tubing connecting said units, the motor unit being operatively connected to the valve, a liquid charge utilizing sufficient control liquid to fill the valve motor unit, tubing and part of the sensing unit, a heater element located proximately to, and in thermal exchange relation to the sensing unit, and in thermal exchange relation to the liquid at the tank level, and an element providing a chamber in the tubular connection which is located remote from the sensing unit, heating element and motor unit, and of such nature and proportions as to provide an augmented capacity in the control line between said units whereby to minimize maximum pressures in the region of the motor unit, responsively to abnormal effect of the heater element on the sensing unit.

5. In a liquid level control system for use with a liquid tank in which it is desired to maintain a fixed liquid level, there being a source of supply to such tank and a valve controlling flow to the tank from the source, a thermally responsive expansible member in controlling relation to said valve, a unit responsive to temperature and located in such position vertically of the tank as corresponds to the desired top level of liquid to be maintained therein, a sensing unit including a fluid charged chambered structure in heat exchange relation to the tank liquid, tubing connecting such unit to the expansible valve controlling member, an electric heating element located close to said chambered structure so as at times to cause expansion of the fluid charge therein, and means variably opposing valve controlling movement of said expansible member, said opposing means consisting of a chambered sensing member spaced at a lower level than the first said sensing unit, a fluid charge in the last said sensing member, an expansible member opposing the first said expansible member, and tubing connecting in functional association the last said sensing unit and the second said expansible member.

6. In a refrigeration system, a tank adapted to contain a liquid refrigerant, a valve for controlling the flow of liquid to said tank, a sensing unit disposed in heat exchange relation with the liquid in the tank at the desired liquid level, the valve including an expansible valve-actuating member, a tubing connecting the expansible valve-actuating member and said sensing unit, a heater element located adjacent, and in thermal exchange relation to the sensing unit, a liquid charge utilizing sufficient control liquid to fill the tubing, the zone adjacent the expansible valve-actuating member, and part of the sensing unit, and a bulb providing a chamber in the tubing, said bulb being located remote from the heating element and remote from the valve, and being located so as to be subject only to a temperature higher than refrigerant temperature, whereby to prevent an increase in pressure in the sensing unit, tubing and on the valve-actuating member above a value corresponding to the temperature of the bulb, and to serve as a receiver for the liquid charge, responsively to an abnormal effect of the heating element on the sensing unit.

7. In a refrigeration system, an evaporator supply tank adapted to contain a liquid refrigerant, a valve for controlling a flow of liquid to said tank, said valve including an expansible valve-actuating member, and a chamber adjacent said valve-actuating member, a sensing unit disposed in heat exchange relation with the liquid in the tank at the desired liquid level, a tubing connecting the valve-actuating member, chamber and sensing unit, a liquid charge utilizing sufficient control liquid to fill the chamber, tubing and part of the sensing unit, a heating element located adjacent to and in thermal exchange relation with the sensing unit, and a chambered bulb communicating with said tubing, said bulb being located remote from said heating element and remote from said valve, and being located so as to be subject only to a temperature higher than refrigerant temperature, whereby to prevent a pressure increase in the chamber, tubing and sensing unit above a value corresponding to the temperature of the bulb, and to serve as a receiver for the liquid charge, responsively to abnoral effect of the heating element on the sensing unit.

References Cited in the file of this patent

UNITED STATES PATENTS

| 1,881,964 | Persons | Oct. 11, 1932 |
| 1,938,167 | Baker | Dec. 5, 1933 |
| 2,022,523 | Roessler | Nov. 26, 1935 |
| 2,353,240 | Huggins | July 11, 1944 |
| 2,379,286 | Dodson | June 26, 1945 |
| 2,624,181 | Erwin | Jan. 6, 1953 |